Patented June 13, 1933

1,914,125

UNITED STATES PATENT OFFICE

FRANK A. HARTMAN, OF HAMBURG, NEW YORK

CORTIN AND METHOD OF PREPARING SAME

No Drawing.   Application filed August 26, 1930. Serial No. 477,977.

This invention relates to adrenal gland extracts and has for its object the provision of an improved method of preparing cortin, the hormone of the adrenal cortex which is essential to life, and cortin so prepared which contains a minimum amount of inert material.

Cortin is the substance of the adrenal gland which is for the most part, or wholly, contained in the outer zone or cortex of the gland, and is that substance upon which the life of vertebrates is dependent for its continued existence, upon the presence and proper functioning of those glands and the hormone given off by the glands. It is also the hormone which stimulates or permits growth in young animals.

If there is a deficiency of adrenal cortical tissue in man or animals, the periodic injection of cortin ameliorates the symptoms and gradually causes their disappearance. The insufficiency of the adrenal cortical tissue may be manifested in various ways, of which the most pronounced are emaciation, loss of appetite and muscular asthenia. Low blood pressure and high blood urea have also been found to be caused by adrenal insufficiency.

It is known that epinephrin or adrenaline may be obtained from the adrenal glands, and it is also known that epinephrin exists not only in the medulla or core of the glands, but in the cortex as well. However, the quantity of epinephrin in the medulla is several times the quantity found in the cortex. On the other hand, cortin, so far as is known at present, is found only in the cortex of the glands.

It has been found that epinephrin or adrenaline is not essential to life and that its administration to animals deprived of their adrenals actually shortens their survival period. Cortin, though, when adiministered to adrenalectomized animals in adequate amounts prolongs their survival period indefinitely and prevents the development of the various symptoms of adrenal insufficiency, thereby helping them maintain an appetite for food, and preventing the development of muscular asthenia. It is thus imperative in the preparation of cortin to separate the epinephrin therefrom.

In my copending application Serial Number 296,868, filed August 1, 1928, I have described and claimed one method of isolating cortin from the other substances occurring in the adrenal glands. Further experimentation with methods of obtaining cortin free from epinephrin have now shown that a more concentrated and hence a more potent extract of cortin than that obtained in my aforesaid application, may be obtained by the following method.

The fresh whole adrenal glands of cattle or other slaughter-house animals are removed soon after death, and kept cold until desired for use. The fresh whole adrenals or, preferably, the cortex of the adrenals alone are finely ground and extracted at or below room temperature, that is, a temperature between 18° and 23° C. with peroxide-free ethyl ether until all of the cortin is removed, the ether being changed from time to time. During the extraction, the container is shaken gently occasionally to facilitate diffusion; also, all air is excluded by displacement with a non-oxidizing gas such as carbon dioxide. The carbon dioxide not only excludes the air, but furnishes a mild acid which has been found advantageous as it helps to prevent emulsification. If the carbon dioxide does not increase the acidity sufficiently, or if otherwise desired, a small amount of any non-oxidizing acid, e. g. acetic acid, may be added. While the whole adrenals may be used, it is obvious that the use of the cortex alone possesses the advantage that deleterious substances which often develop in the medulla are absent.

The use of ether in the extraction possesses a distinct advantage over other solvents, as I have found that while more or less readily taking up the cortin, the ether takes up very little epinephrin, which is present in considerable quantities even in the cortex. Ether possesses the further advantage in that it may be removed at relatively low temperatures, particularly when a partial vacuum is used. The use of high temperatures, customarily used in the extraction of epinephrin, tends to destroy the cortin present in the extract.

Instead of adding ether alone to the gland material, the latter may first be thoroughly mixed with enough sodium chloride to saturate the water present. The ether and carbon dioxide are then added and the extraction proceeded with as when ether alone is used, except that very vigorous shaking from time to time is found advantageous. The addition of the sodium chloride is advantageous in that it prevents emulsification.

Whether the sodium chloride is used or not in the extraction, the various fractions of ether are collected and the ether removed by distillation in vacuo. The residue which is left after the distillation contains the cortin together with such inert material which was dissolved by the ether during the extraction. Such inert materials are fats and lipoids which are physiologically inactive, and as herein used "inert solids" or "inert materials" means materials which are physiologically inactive.

The residue from the distillation is promptly extracted a number of times with ethyl alcohol, which is slightly warmed but not to more than 45° C. The extraction of the residue is carried on as quickly as possible, and the alcohol extract quickly chilled to prevent injury to the cortin. The various alcoholic fractions from the extraction are added together and cooled to so low a temperature that all inert substances are precipitated, which may be precipitated in this manner. During this precipitation the temperature should be lowered to at least −10° C. When the precipitation is complete, the precipitate is separated by cold filtration. The filtrate containing the cortin is then subjected to distillation in vacuo at a low temperature to remove the alcohol. The residue which contains the cortin, any epinephrin which was taken up by the ether during the original extraction, and a small amount of inert material, is now extracted with a small amount of ethyl ether, or with water, but preferably with ethyl ether as it dissolves the cortin but leaves behind most of the epinephrin which was dissolved by the large quantity of ether used during the original extraction.

When the extraction is carried out with the ether, the latter is removed from the extract by distillation in vacuo. The residue, which then consists essentially of cortin and inert matter is extracted with sufficient water to make the desired concentration of the hormone. Much of the inert material is insoluble in water and is therefore left behind. The extract is then made isotonic with the body fluids by the addition of sodium chloride, and filtered through a bacteria filter to remove any insoluble material together with bacteria.

When the residue from the final alcoholic distillation is extracted directly with water, the cortin passes into solution and the solution is filtered to remove inert material. The aqueous filtrate is repeatedly washed with ethyl ether to remove cortin from the epinephrin which was originally taken up in the extraction of the gland material with ether, epinephrin being more soluble in water than in ether. The ether is removed by distillation in vacuo, and the residue taken up with water or ethyl alcohol to make the desired concentration. If the extract is to be used soon for injection, water is preferred to the ethyl alcohol as the solvent. Enough sodium chloride is added to make the extract isotonic with the body fluids and the extract passed through a bacteria filter to remove any insoluble material, together with bacteria.

If the cortin is to be kept for any substantial length of time, it can be dissolved in 80% or stronger alcohol, and thereby preserved.

The method herein described makes it possible to obtain a very concentrated and hence a very potent extract of the vital hormone of the adrenal cortex. The final aqueous extract of the cortin ready for therapeutic use before the sodium chloride is added contains not more than about 0.02 milligrams or less of solids for each gram of fresh cortex used. This is due principally to the use of ether as the extracting solvent, whereby only a small amount of the epinephrin is taken up and the use of low temperatures while filtering the alcoholic extract. It also, by reducing the number of essential operations necessary, permits the extract to be obtained at a cost less than by methods heretofore used.

While the invention has been described in considerable detail, I do not wish to limit myself in the preparation of the extract except as set forth in the appended claims.

What I claim is:

1. The method of preparing cortin from the adrenal cortex which comprises grinding the cortex, extracting the ground cortex with ether, removing the ether from the extraction, extracting the residue with alcohol, removing the alcohol from the alcoholic extraction, extracting the cortin from the residue with a solvent, and recovering the cortin therefrom.

2. The method of preparing cortin from the adrenal cortex which comprises grinding the cortex, extracting the ground cortex with ether in a non-oxidizing atmosphere, distilling the extraction in vacuo to remove the ether, extracting the residue with alcohol at a temperature not exceeding 45° C., cooling the alcoholic extraction to a low temperature to precipitate inert substances, filtering while cold to remove precipitated matter, distilling the filtrate in vacuo to remove alcohol, extracting the residue with ether to separate the cortin from epinephrin, distilling the ethereal extraction in vacuo to remove the ether, and dissolving the residue of cortin.

3. The method of preparing cortin from the adrenal cortex, which comprises grinding the cortex, acidulating the ground cortex, extracting the acidulated mixture with peroxide-free ether while the mixture is maintained in a non-oxidizing atmosphere, removing the ether from the extraction, extracting the residue with warm alcohol, removing the alcohol from the alcoholic extraction, extracting the residue with a small amount of ether to separate the cortin from the epinephrin and recovering the cortin from the ethereal extraction.

4. The method of preparing cortin from the adrenal cortex, which comprises grinding the cortex, extracting the ground cortex with ether, removing the ether from the extraction, extracting the residue with alcohol, removing the alcohol from the alcoholic extraction, extracting the residue with a small amount of ether, and recovering the cortin from the ethereal extractions.

5. The method of preparing cortin from the adrenal cortex which comprises grinding the cortex, extracting the ground cortex with ether to remove the cortin, removing the ether from the extraction, extracting the residue with alcohol, and recovering the cortin from the alcoholic extraction.

6. The method of preparing cortin from adrenal cortex, which comprises grinding the cortex, adding sodium chloride to the ground mixture, extracting the mixture with ether, removing the ether from the extraction, extracting the residue with alcohol, removing the alcohol from the alcoholic extraction, extracting the residue with a small amount of ether, removing the ether from the ethereal extraction and dissolving the remaining cortin.

In testimony whereof I affix my signature.

FRANK A. HARTMAN.